United States Patent [19]

Carmillet

[11] Patent Number: 5,146,804
[45] Date of Patent: Sep. 15, 1992

[54] MECHANISM INCORPORATING A VIBRATION DAMPER, IN PARTICULAR FOR AN AUTOMATIVE VEHICLE

[75] Inventor: Roger F. Carmillet, Franklin, Mich.
[73] Assignee: Valeo, Paris, France
[21] Appl. No.: 618,991
[22] Filed: Nov. 28, 1990

[30] Foreign Application Priority Data

Nov. 30, 1989 [FR] France .......................... 89 15779

[51] Int. Cl.⁵ ............................................ F16H 55/18
[52] U.S. Cl. .......................................... 74/440; 74/411; 74/355; 74/574; 464/66
[58] Field of Search ................. 74/440, 411, 355, 357, 74/574; 464/66, 81, 82, 67, 76

[56] References Cited

U.S. PATENT DOCUMENTS

| | | | |
|---|---|---|---|
| 1,757,337 | 5/1930 | Royce | 464/66 |
| 2,401,192 | 5/1946 | Rovick | 74/355 |
| 3,292,446 | 12/1966 | Scofield et al. | 74/411 X |
| 3,350,954 | 11/1967 | Ruettinger | 74/411 X |
| 4,489,621 | 12/1984 | McIntosh | 74/355 |
| 4,739,670 | 4/1988 | Tomita et al. | 74/440 X |
| 4,790,792 | 12/1988 | Bopp | 464/66 |
| 4,873,882 | 10/1989 | Goscenski, Jr. | 74/411 |

FOREIGN PATENT DOCUMENTS

| | | |
|---|---|---|
| 0166059 | 1/1986 | European Pat. Off. . |
| 3442738 | 6/1985 | Fed. Rep. of Germany . |
| 3607240 | 9/1986 | Fed. Rep. of Germany . |
| 2626337 | 7/1989 | France .. |
| 0247858 | 10/1989 | Japan ............... 74/573 R |
| 650746 | 2/1951 | United Kingdom . |
| 0167457 | 1/1986 | United Kingdom ........ 74/440 |

*Primary Examiner*—Leslie A. Braun
*Assistant Examiner*—Winnie Yip
*Attorney, Agent, or Firm*—Longacre & White

[57] ABSTRACT

A vibration damper having cooperating groups of fins is mounted within the double inverter pinion in a gearbox of the fluid lubricated kind, the double inverter pinion being mounted rotatably on an axle and being arranged to be driven in rotation on a gearbox shaft and to mesh with a gearbox pinion. The double inverter pinion is divided into two separate pinions, namely a first pinion carrying one group of fins extending axially from it, and a second pinion carrying the other group of fins, the first pinion being mounted on the second pinion.

8 Claims, 2 Drawing Sheets

MECHANISM INCORPORATING A VIBRATION DAMPER, IN PARTICULAR FOR AN AUTOMATIVE VEHICLE

FIELD OF THE INVENTION

This invention relates to vibration dampers for automotive vehicles, and more particularly to the mechanism comprising two coaxial parts which are mounted for rotation with respect to each other within the limits of a predetermined angular displacement and against the action of resilient means which are operatively interposed between two groups of fins, which are fixed with respect to a respective one of the said coaxial parts for rotation with that part and which extend generally in radial planes, with each group of fins being carried by a carrier element and with any one fin of a said group being interposed circumferentially between two fins of the other group.

BACKGROUND OF THE INVENTION

A damper of the above kind is described in the German published patent specification DE-3442738A, in which the rotating shaft is divided into two parts, one of which is formed with a chamber in which the said fins are mounted. Bearing means are also provided. Such an arrangement requires a very large number of components, and is relatively complicated as a result of the division of the shaft into two parts.

In consequence, the arrangement is unable to respond, as conveniently as might be desired, to various requirements which are imposed in practice.

DISCUSSION OF THE INVENTION

An object of the invention is to overcome these disadvantages by providing a vibration damping device which is adaptable more conveniently, and in a simple and economical manner, to the various requirements imposed in practice; while also producing further advantages.

In accordance with the invention, a vibration damper of the kind defined above is characterised in that it is mounted in a fluid lubricated gearbox, within a double inverter pinion which is rotatably mounted on an axle and which is adapted, firstly to be driven in rotation on a shaft of the gearbox and secondly to mesh with a pinion of the gearbox, the damper being further characterised in that the said double pinion is divided into two separate pinions, namely a first pinion carrying one of the said groups of fins and a second pinion carrying the other group of fins, and with the second pinion carrying the first pinion, which is mounted on the second pinion.

The invention removes the need to divide the shaft into two parts, and the device according to the invention is easily assembled with the gearbox without significant adaptation, in a location in which vibrations are particularly likely to be felt. In addition, advantage is taken of the lubricating fluid that is contained in the gearbox itself (for lubricating the springs and to provide viscous damping), to act in cooperation with the fins so as to absorb the vibrations that are present in the transmission.

The double pinion may preferably be the inverter pinion for reverse gear, the damper being operative during forward motion.

It will be appreciated that this arrangement is compact, while having a very high sensitivity to variations in the movement of the shaft concerned.

In accordance with a preferred feature of the invention, the spacing of the fins is not regular circumferentially, and resilient means are associated with only some of the fins, so that variable volume chambers are defined between these fins to effect damping of the vibrations. These fins may in addition be profiled in such a way as to increase the damping effect even more.

The following description illustrates preferred embodiments of the invention, by way of example only, with reference to the accompanying drawings.

DESCRIPTION OF PREFERRED EMBODIMENTS OF THE INVENTION

Figure 1:
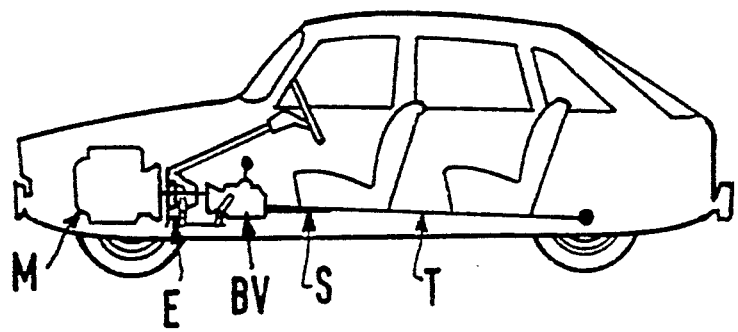
FIG. 1 is a diagrammatic view of an automotive vehicle with its drive train.

Referring first to FIG. 1, the drive train of the automotive vehicle is shown with the internal combustion engine M of the vehicle. The drive train extends from the engine M to the road wheels, and comprises a coupling and starting member E, for example a dry friction clutch, which is connected to an input shaft of a lubricated mechanical gearbox BV. The rotating output shaft of the gearbox is seen at S, and is coupled to a transmission shaft T for driving the propulsion road wheels of the vehicle. Besides the input shaft and the output shaft, the gearbox BV includes at least one secondary shaft, an axle, and gear wheels mounted on the above mentioned shafts and axle so as to produce the various gear ratios by mutal engagement between the appropriate gear wheels. The said axle carries a double pinion 10 which is described below. The gearbox BV is lubricated in the usual way by being filled at least partially with a lubricating fluid, commonly oil.

A vibration damper is mounted in the drive train. This vibration damper comprises two coaxial parts A, B, which are mounted for rotation with respect to each other within the limits of a predetermined angular displacement and against the action of resilient means 1. The latter are operatively interposed between two groups of fins 3 and 4, each of which is fixed with respect to a respective one of the two coaxial parts A and B, for rotation with that part. The fins extend generally in radial planes. Each group of fins is attached to a carrier element 20, 30, with any one fin 3, 4 of a group being interposed circumferentially between two fins 3,4 of the other group.

Figure 3:
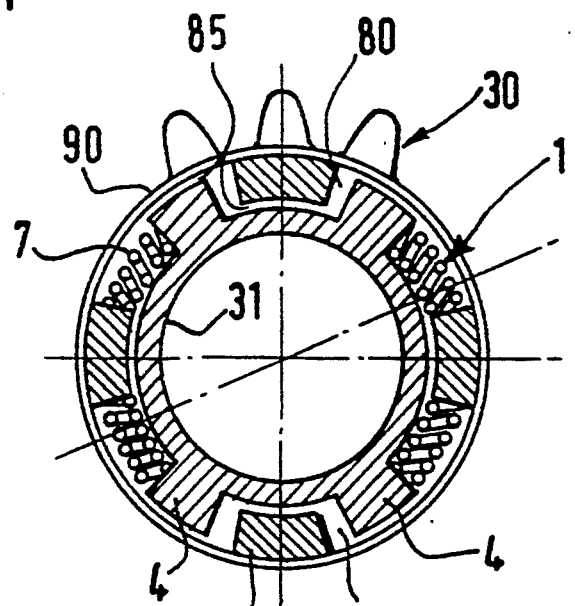
FIG. 3 is a view seen in cross section on the line 3—3 in FIG. 2.

In FIG. 3, the resilient means 1 include a plurality of resilient members 7 acting circumferentially and being in the form of coil springs. Each of these springs bears, at one of its circumferential ends, on a fin 3 of one group of fins, while at its other circumferential end it bears on a fin 4 of the other group, in a manner to be described below.

Figure 2:
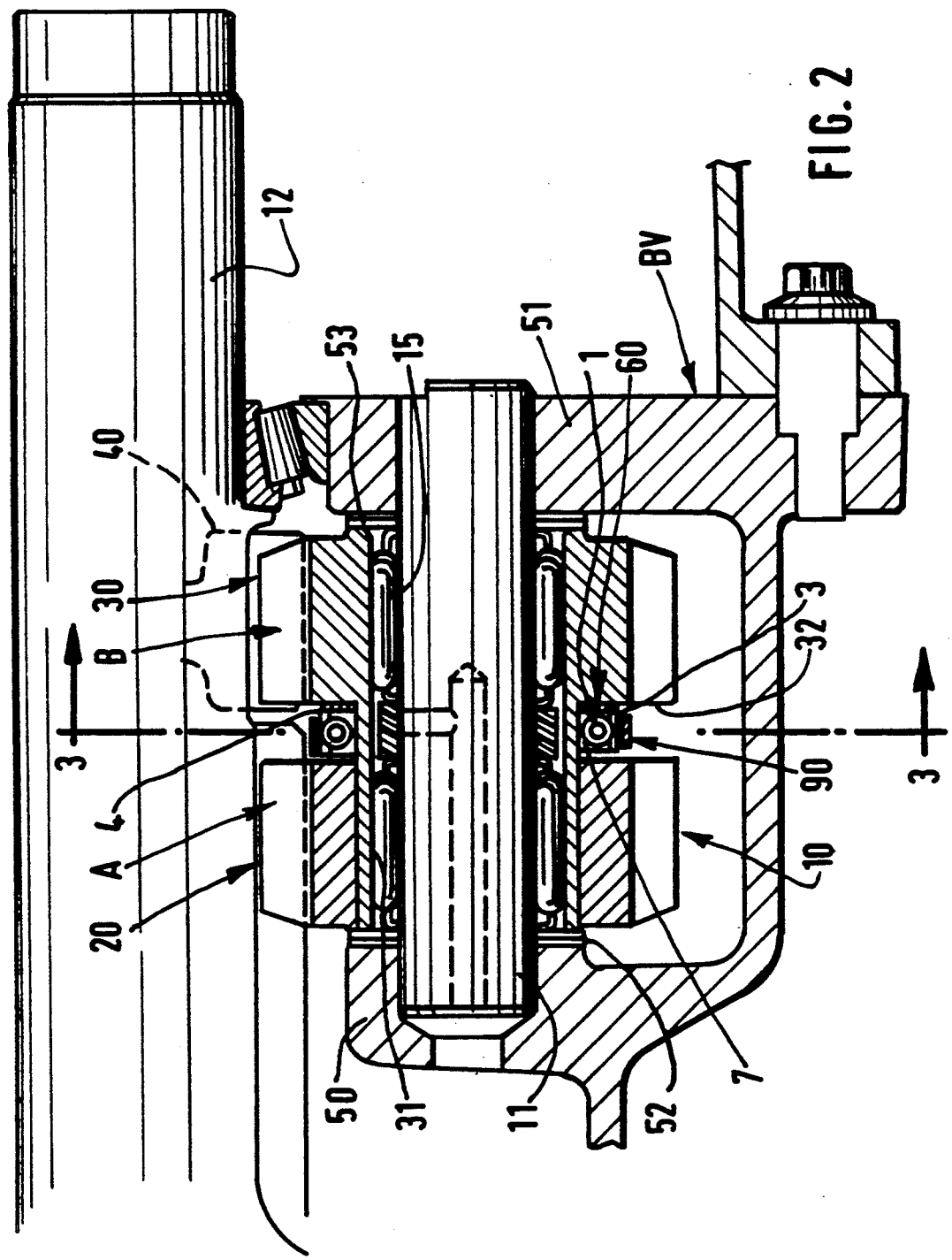
FIG. 2 is a view in axial cross section of the damper in accordance to the invention.

With reference now to FIG. 2, the vibration damper is mounted in the fluid lubricated gearbox BV, within a double inverter pinion 10 which is rotatably mounted on an axle 11. The pinion 10 is adapted firstly to be set in rotation on a shaft 12 of the gearbox, and secondly to mesh with a pinion of the gearbox. The double pinion 10 is divided into two separate pinions 20 and 30. The first pinion 20 carries one of the groups of fins, while the second pinion 30 carries the other group of fins: it also carries the first pinion 20 which is mounted coaxially with it.

More precisely, in this example the double pinion 10 is the inverter pinion for reverse gear, with the first pinion 20 meshing with the secondary shaft 12 of the gearbox, which is splined for this purpose, while the second pinion 30 meshes with the reverse gear pinion 40 of the gearbox. The splines on the shaft 12 are interrupted so as to permit passage of the second pinion 30. The latter is rotatably mounted on the axle 11 through a rolling bearing 15 which in this example comprises two needle races. The second pinion 30 is supported axially between two walls 50 and 51 of the gearbox, through spacer rings 52 and 53. These walls 50 and 51 serve as shoulders for the rings 52 and 53, and also as supports for the mounting of the axle 11, which is offset radially with respect to the gearbox shaft 12. For this purpose each wall 50 and 51 is formed with appropriate openings.

The pinion 30 thus extends axially between two rings 52 and 53. It has a smooth sleeve portion 31 of the reduced diameter, on to which the first pinion 20 is threaded so as to be carried by the second pinion 30. The first pinion 20 carries the fins 3 which project axially from it, and is supported axially by both the spacer ring 52 and the relatively massive toothed portion of the second pinion 30. The first pinion 20 is located by the shoulder 32 which is defined by the change in diameter of the second pinion 30 at the root of the sleeve portion 31 of the latter.

In this example, the pinion 20 is supported on the pinion 30 indirectly through a thrust ring 60. The fins 4 project axially towards the pinion 20 from the pinion 30 by which they are carried. The groups of fins 3 and 4 thus extend between the respective toothed portions of the pinions 20 and 30 and act as spacers between them.

At is best seen in FIG. 3, each group of fins 3 or 4 comprises three fins, while only four of the springs 7 are provided, the fins 3 associated with the first pinion 20 being wider in the circumferential direction. Thus, two diametrically opposed chambers 80 and 81 are formed, these chambers being delimited by two of the fins 4, with one of the fins 3 penetrating into a respective one of these chambers 80 and 81 without being associated with any resilient means. It will be noted that the circumferential distance between the adjacent fins 3 and 4 is smaller in the chambers 80 and 81 than where springs 7 are provided between them. The fins 3 in the chambers 80 and 81, by cooperation with the associated fins 4, serve as end stops and limit the relative angular displacement between the two pinions 20 and 30. The circumferential distribution of the fins is thus not regular.

A retaining band or ring 90 is mounted on the fins 3 for retaining the springs. The retaining band 90 delimits the chambers 80 and 81, and it will be noted that calibrated passages 85 are provided firstly between the sleeve portion 31 of the pinion 30 (which constitutes an internal carrying element for the fins 4) and the inner edge of the fins 3, and secondly between the outer periphery of the fins 4 and the retaining band 90.

When the reverse gear pinion 40 is free, the mechanism acts in the following way. When the movement of the shaft 12 is uniform, the two pinions 20 and 30 rotate in unison, and frictional effects are minimised. However, when the movement of the shaft 12 is not uniform, one of the pinions becomes displaced circumferentially with respect to the other, against the force which is exerted by the spring 7, with two of the latter becoming compressed while the other two become extended, and vice versa.

During this relative movement, the volume of the chambers 80 and 81 is changed, and a transfer of gearbox oil takes place through the calibrated passage mentioned above. This tends to damp any vibrations by creation of a viscous damping effect. The damper thus constitutes a resonator, the frequency can be caused to vary as a function of the stiffness of the spring 7 and of the viscous damping effect obtained by means of the chambers 80 and 81.

When the pinion 40 is in mesh (i.e. during reverse movement of the vehicle), the fins 3 and 4 associated with the chambers 80 and 81 come into abutment with each other.

The present invention is of course not limited to the embodiments described. In particular, there may be any desired number of springs, and any desired number of fins and damping chambers, depending on the requirements of the particular application.

Figure 4:
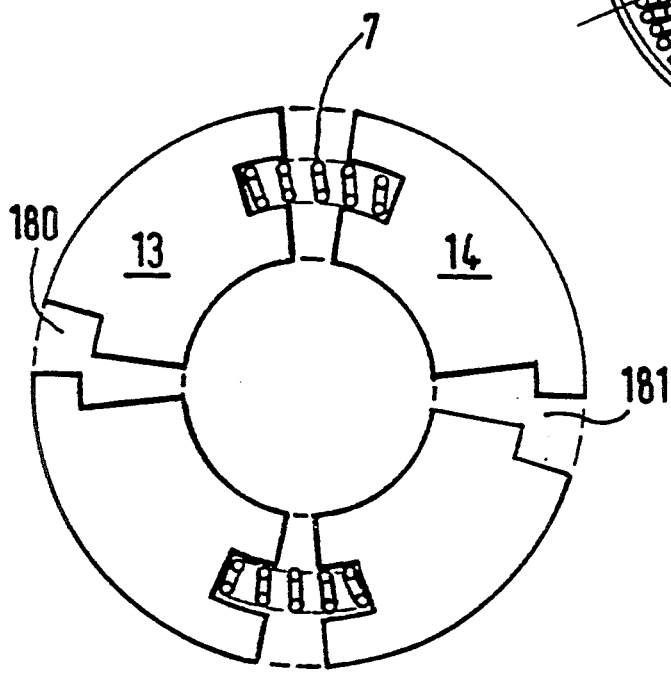
FIG. 4 is a partial view in axial cross section, similar to that of FIG. 3, but showing a second embodiment of the invention.

Similarly, the profiles of the fins may be modified and may be non-straight as shown in FIG. 4, so as to improve the viscous damping effect. It will be noted that in FIG. 4 that only two springs 7 are provided, and that the fins, of which there are two in each group and which are here denoted by the reference numerals 13 and 14, are locally recessed to accommodate the spring 7 and to give radial support to the latter. The retaining band or ring 90 is thus not required in this embodiment.

In the embodiment of FIG. 4, the fins are shortened centrally in the relatively massive toothed portions of the pinions 20 and 30 which are close to each other, while all the fins play a part in the limitation of the relative angle of displacement between the pinions 20 and 30. The non-straight shape of the fins 13 and 14 enables the chambers 180 and 181 to be defined at the outer periphery of the fins by means of recesses and projections, extending circumferentially and complementary to each other, formed in the fins themselves.

The rolling means 15 may consist of ball bearings or the like.

What is claimed is:

1. A transmission mechanism for an automotive vehicle comprising a vibration damper and a fluid lubricated gearbox including a gearbox shaft, a gearbox pinion, and an axle, the vibration damper comprising a double inverter pinion and means mounting the double inverter pinion rotatably on said axle, the double inverter pinion being divided into two separate pinions, namely a first pinion and a second pinion, one of said first and second pinions mounting the other coaxially thereon for relative rotational movement of one of said pinions with respect to the other, said first pinion fixedly carrying a first group of fins and the second pinion fixedly carrying a second group of fins, said fins extending generally in radial planes with any one fin of a group being interposed circumferentially between two fins of the other group to define limits of predetermined angular displacement between said first and second pinions, the vibration damper further including resilient means operatively interposed between said groups of fins to resist said angular movement, said vibration damper being defined within the double inverter pinion in the gearbox, with one of said first and second pinions being arranged to be coupled in rotation with said gearbox shaft and the other being arranged to mesh with said gearbox pinion, wherein said resilient means comprise a plurality of resilient members, each interposed circumferentially between a fin of one said group and a fin of the other said group, there being fewer of said resilient members than of the fins in total, whereby between two consecutive fins of one group, there is at least one chamber from which said resilient members are absent.

2. A vibration damper according to claim 1, further comprising rolling means mounting the second pinion on said axle, the gearbox further comprising two walls mounting the axle, the second pinion being supported axially between the two walls.

3. A vibration damper according to claim 2, further comprising spacer rings supporting said second pinion axially between the two walls of the gearbox, the second pinion having a smooth sleeve portion of reduced diameter mounting the first pinion thereon.

4. A vibration damper according to claim 3, wherein the second pinion has a toothed portion defining a shoulder at the change in diameter between the toothed portion and said portion of reduced diameter, the first pinion being supported axially between one of said spacer rings and said shoulder.

5. A vibration damper according to claim 4, further including a thrust ring indirectly supporting the first pinion on the second pinion, said fins extending axially from said first and second pinions.

6. A vibration damper according to claim 1, further comprising a retaining band enclosing the fins associated with the first pinion, and defining calibrated passage means with the fins associated with the second pinion.

7. A vibration damper according to claim 1, having a calibrated passage between the fins associated with the first pinion and said portion of reduced diameter of the second pinion.

8. A vibration damper according to claim 1, wherein the fins have a non-straight profile.

* * * * *